US008966537B2

(12) United States Patent
Sciammarella

(10) Patent No.: US 8,966,537 B2
(45) Date of Patent: Feb. 24, 2015

(54) SYSTEM, METHOD, AND ARTICLE OF MANUFACTURE FOR A USER INTERFACE FOR A NETWORK MEDIA CHANNEL

(75) Inventor: Eduardo A. Sciammarella, Los Angeles, CA (US)

(73) Assignee: Eduardo Sciammarella, Los Angeles, CA (US)

( * ) Notice: Subject to any disclaimer, the term of this patent is extended or adjusted under 35 U.S.C. 154(b) by 0 days.

(21) Appl. No.: 11/641,186

(22) Filed: Dec. 18, 2006

(65) Prior Publication Data

US 2007/0168544 A1 Jul. 19, 2007

Related U.S. Application Data

(63) Continuation-in-part of application No. 11/312,291, filed on Dec. 19, 2005.

(60) Provisional application No. 60/751,802, filed on Dec. 19, 2005.

(51) Int. Cl.
| | | |
|---|---|---|
| H04N 5/445 | (2011.01) | |
| G06F 3/00 | (2006.01) | |
| H04N 7/173 | (2011.01) | |
| G06F 15/16 | (2006.01) | |
| H04N 21/61 | (2011.01) | |
| H04N 21/2743 | (2011.01) | |
| H04N 21/414 | (2011.01) | |
| H04N 21/443 | (2011.01) | |

(52) U.S. Cl.
CPC ....... *H04N 21/6125* (2013.01); *H04N 21/2743* (2013.01); *H04N 21/41407* (2013.01); *H04N 21/443* (2013.01)

USPC .................. 725/54; 725/48; 725/53; 725/55; 725/56; 725/105; 709/203

(58) Field of Classification Search
USPC .......................................................... 709/203
See application file for complete search history.

(56) References Cited

U.S. PATENT DOCUMENTS

| | | | |
|---|---|---|---|
| 6,108,706 A | 8/2000 | Birdwell et al. | |
| 6,628,625 B1 | 9/2003 | Birdwell et al. | |
| 6,675,205 B2* | 1/2004 | Meadway et al. | 709/219 |
| 6,714,964 B1 | 3/2004 | Stewart et al. | |
| 6,727,927 B1 | 4/2004 | Dempski et al. | |
| 2002/0083127 A1 | 6/2002 | Agrawal | |
| 2003/0002441 A1 | 1/2003 | Banerjee et al. | |
| 2003/0051055 A1 | 3/2003 | Parrella et al. | |
| 2003/0093476 A1 | 5/2003 | Syed | |
| 2003/0177186 A1* | 9/2003 | Goodman et al. | 709/205 |
| 2003/0233417 A1* | 12/2003 | Beyda et al. | 709/206 |
| 2004/0070678 A1* | 4/2004 | Toyama et al. | 348/231.3 |
| 2004/0205582 A1 | 10/2004 | Schiller et al. | |
| 2005/0010635 A1* | 1/2005 | Schwesig et al. | 709/203 |
| 2005/0076058 A1 | 4/2005 | Schwesig et al. | |
| 2005/0177645 A1 | 8/2005 | Dowling et al. | |

* cited by examiner

*Primary Examiner* — Gigi L Dubasky

(57) ABSTRACT

A user interface for a network media channel allows subscribers to share media files according to ad-hoc specification via kernels. The user interface may be accessed via a device and it may be utilized to create and/or modify media files and/or kernels and to transmit them to one or more networks including one or more servers that stores the media files according to the kernels. The user interface may be used further to receive one or more media files and to display them according to the kernels. The user interface may be used further to navigate thru the media files by clicking (activating) the media files.

22 Claims, 11 Drawing Sheets

SYSTEM, METHOD, AND ARTICLE OF MANUFACTURE FOR A USER INTERFACE FOR A NETWORK MEDIA CHANNEL

CROSS REFERENCE TO RELATED APPLICATIONS

The present patent application is a formalization of a previously filed, provisional patent application entitled "System, Method, and Article of Manufacture for a User Interface for a Network Media Channel," filed Dec. 19, 2005, as U.S. patent application Ser. No. 60/751,802 by the inventor named in this application. This patent application claims the benefit of the filing date of the cited provisional patent application according to the statutes and rules governing provisional patent applications, particularly 35 USC §119 and 37 CFR §1.78. The specification and drawings of the cited provisional patent application are specifically incorporated herein by reference.

The present patent application is further a continuation-in-part of a co-pending non-provisional patent application entitled "System, Method, and Article of Manufacture for a Network Media Channel," filed Dec. 19, 2005, as U.S. patent application Ser. No. 11/312,291 by the same inventor. This patent application claims the benefit of the filing date of the cited non-provisional patent application according to the statutes and rules governing non-provisional patent applications, particularly 35 USC §120 and 37 CFR §1.78. The specification and drawings of the cited non-provisional patent application are specifically incorporated herein by reference

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to a user interface for a network media channel that is easy to use, non-technical, and accessible. More specifically, the present invention is related to a user interface for a network media channel that is based on people, time, place, and media.

BACKGROUND

The present invention relates to a user interface for a network media channel that facilitates easy access to media files across one or more networks. More specifically, the present invention focuses on a user interface that is defined by a person-centric data-aggregation model. The navigation path to data is organized primarily through the people that it is associated with. The organizing categories of the user interface structure, among others, are people, media, time, and location which may be realized through the use of kernels associated with the media files. Each of these categories can become a primary organizing element for the data.

The key activity that this framework and the user interface are well suited for is sharing of data between people. It facilitates the capturing of photos, audio, and movies which can then be shared with others. The user interface further allows for the download, streaming, and interaction with entertainment or informational content that can be consumed and shared. It further allows for the creation and promotion of events which can be shared. It also allows for the browsing, annotation, and sharing of entertainment and information about physical places.

The user interface is organized around a buddy list. By quickly browsing through that list one is able to quickly see the data associated with each person. The associations may be classified into four primary categories; user-generated content, entertainment or information content, scheduling and events, and physical places. The view of one's buddy list with its associated data set defines a fundamental view of the user interface. One may choose to look deeper into each of the four categories. The four categories may also be thought of as application modules. Each of the modules is associated with the primary buddy list and can be interrelated with the other modules. Each module can also exist independently of the other modules. Finally each module can also be a launcher for more specific applications. For example one can navigate to a person's entertainment and information content and launch a media player to interact with that content.

By navigating to one of the modules and browsing the data it contains one is able to begin to traverse the data set through the other categories of people, time, media, and place. For example a place may have associated media, or an event may have associated people. These associations can also provide navigation paths between modules as well as encapsulate higher order groupings. For example by navigating to a single person's user-generated content one can link to an event, or place to which that content is associated with. By traversing the data set this way one is enabled to quickly discover groups of people that are linked to an event. One may also discover events that are linked over time to become an on-going series.

The user interface can exist across multiple physical devices. The simplest separation would be between a mobile device such as a mobile phone, and a PC. Depending on the capabilities or specific function of the mobile phone one might have a limited sub-set of the four modules. On the PC as a networked application one could have all the modules integrated into the full suite. For example a user may have a networked media player that has the primary buddy-list with only the entertainment and information module. This would allow the user to share entertainment and information media with other people with the device. If a user wanted to share user-generated content, event, and location information, the user could still do this via a networked application on a PC. The user would identify himself/herself through an application to a server and a replication of his/her entertainment and information module from his/her device would be available along with the other modules. One can also imagine device specific scenarios for user-generated content, events, and locations. In this sense the user interface may be implemented as both a client and server solution. One's full data set is always accessible on the server, one or more clients can have a full or limited view of that data set.

Because the user interface is primarily about sharing communication is central to it's function. By selecting a specific person one can access a unified communication interface. Rather than having one to choose a communication modality and then choose a person to communicate with, a unified communication interface keeps the primacy of the person. One can choose a person and then choose from an array of communication modalities. This is also true for incoming messaging. Rather than going to different applications for email, instant messaging, voicemail, SMS, and MMS all one's messaging is grouped and linked to a person or group that it is associated with. For example by selecting a person one can go to an inbox that is pre-filtered to include all messages with/from that person. One can also easily go to a global inbox, which would not be pre-filtered by people but rather organized by time.

The user interface provides for filtering and sorting a user's buddy list. Filtering allows the user to create sub-sets of his/her list. These subsets can be quickly accessed and edited or new ones created. The user interface also allows for the swapping of groups of sets. For example if it is being used on a mobile phone a user may have one set of groups for his/her contacts in his/her local city. If the user is planning to travel to another country, say Japan, he/she can swap-out his/her local group set and load his/her Japan set of groups. Sorting one's buddy list includes sorting it in alphabetical order much like an address book. One can also sort it by who is online/present, who is closest to him/her, and by inbound/outbound/missed communication. It would also be possible to create new sorting filters that could do with shared interests.

The user interface may be associated with four application modules that are known as LifeChannel, MediaLife, NaviLife, and LocalLife. LifeChannel may be configured as a mobile bloging or mobloging application that makes bloging from one's mobile device simple and compelling. MediaLife may be configured to bring all one's downloaded/streamed, movies, music, and games together and allows him/her to see what others are watching, listening, and playing. NaviLife may be configured to coordinate events between two people or a group. It brings the power of electronic invitations to the mobile phone. LocalLife opens up the world of personal publishing to the physical world allowing one and his/her group of friends to mark-up the real world with information that is important to him/her. All of these applications may exist in some way today, but it has yet to be brought together in a truly unified way. This unified framework creates a platform that enables applications and experiences that can not be supported otherwise.

SUMMARY

A network media channel was disclosed in the above identified co-pending non-provisional patent application. The present invention discloses a system, method and article of manufacture for a user interface that may be used to access one or more network media channels such as the one disclosed in the co-pending non-provisional patent application. The network media channel includes a system comprising one or more devices, networks, and servers. A transmitting subscriber may use one of the devices to create one or more media files and upload them along with a first kernel to a server via a network. The server stores the media files in a repository and allows access to said media files according to the first kernel. The first kernel is used to create an ad-hoc specification regarding the media file. One or more receiving subscribers may further create a second kernel to receive the one or more media files according to the second kernel. Accordingly, the operation of the first and second kernels, specified by the transmitting and receiving subscribers, provides for an impromptu exchange of information while reducing the network traffic. The user interface of the present invention facilitates a user friendly, intuitive access to the network media channel for sharing media files.

In one aspect, a user interface is provided that allows subscribers to create and/or modify, upload, and download, one or more media files associated with a corresponding kernel. Preferably, the user interface is accessed via a device that may include mobile phones, personal computers, personal digital assistants, and/or laptop computers, capable of creating media files which comprise text, image, audio, and/or video components. Preferably, the user interface allows a user to create one or more media files along with a kernel which may be uploaded for sharing with other subscribers. Preferably, the kernel comprises a temporal, spatial, channel identity, and/or mask components. Preferably, the temporal component includes a local time and/or a temporal period, the spatial component includes a geographic location and/or a spatial boundary, the channel identity includes a LifeChannel for user-generated content, a MediaLife for entertainment and information content, a NaviLife for scheduling and event content, and/or a LocalLife for location content, and the mask component includes a keyword and/or an identification list, the latter may include at least one of a name, gender, age, and physical attribute.

In another aspect, a user interface is provided that allows subscribers to create and/or modify, upload, and download, one or more media files associated with a corresponding kernel. Preferably, the user interface further allows a user to modify one or more media files and kernels and transmit the modified files and kernel.

In another aspect, a user interface is provided that allows subscribers to create and/or modify, upload, and download, one or more media files associated with a corresponding kernel. Preferably, the user interface allows a user to create a kernel, transmit the kernel, receive, and then automatically display one or more media files according to the kernel. Preferably, the user interface may further allow a user to receive a notice indicative of an update.

In another aspect, a user interface is provided that allows subscribers to create and/or modify, upload, and download, one or more media files associated with a corresponding kernel. Preferably, the user interface may access one or more networks such as GearON, Flickr, EVDB, last.fm, AIM, MSN, and Yahoo, where one or more media files from said networks can be shared. Preferably, the user interface allows a user to receive one or more media files associated with an aggregate buddy list. Preferably, the aggregate buddy list comprises a collection of one or more persons associated with one or more networks.

In another aspect, a user interface is provided that allows subscribers to create and/or modify, upload, and download, one or more media files associated with a corresponding kernel. Preferably, the user interface, automatically displays one or images of subscribers wherein each image is associated with one or more media files belonging to the subscribers. Preferably, the one or more images of the subscribers may, alternatively, be associated with URLs wherein each URL is associated with a network. Preferably, the user interface may display one or more images of subscribers, wherein each image is associated with one or more channel identity component of a kernel.

DETAILED DESCRIPTION OF THE PRESENTLY PREFERRED EMBODIMENTS

Figure 1:
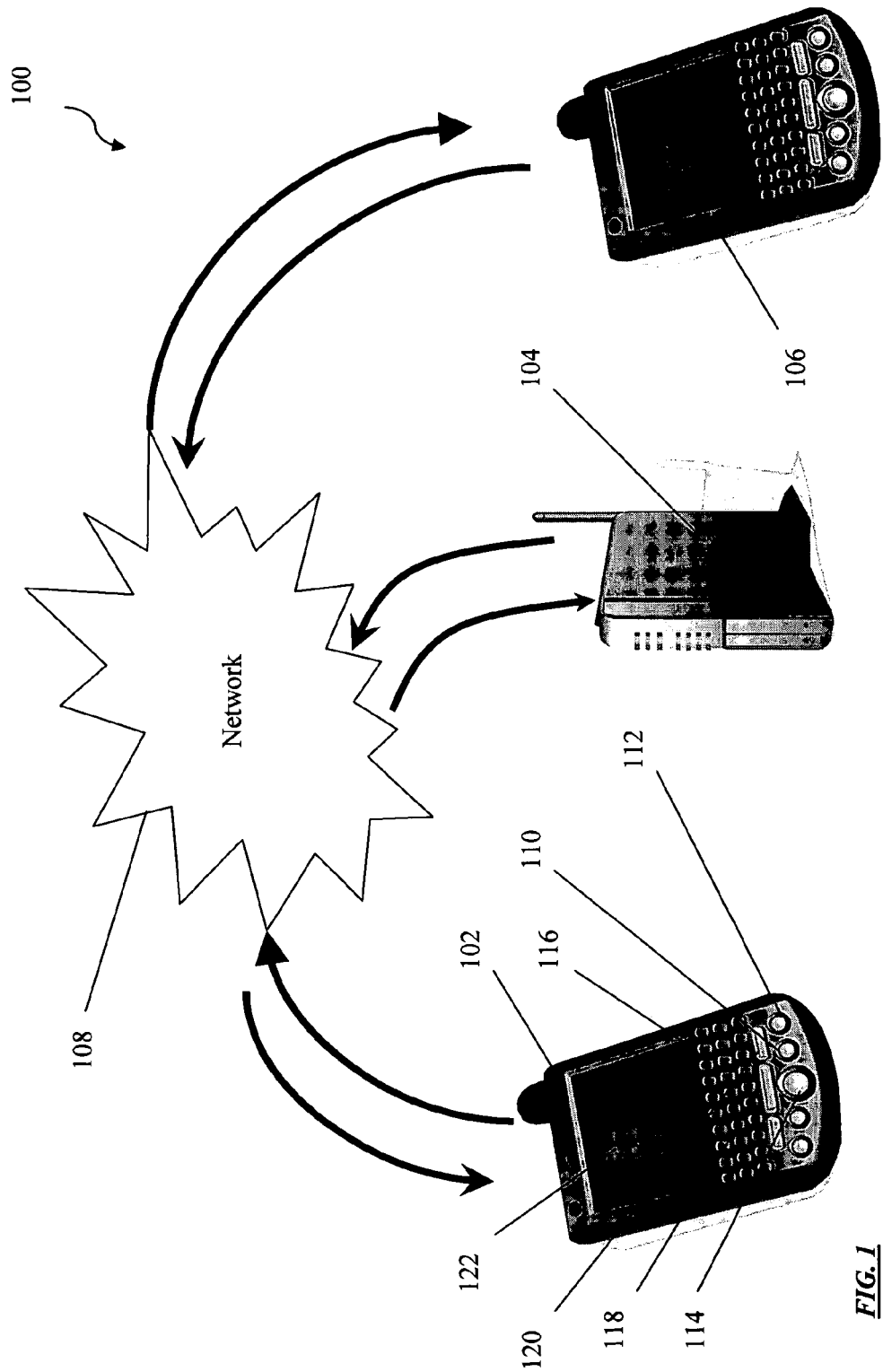
FIG. 1 is a diagram depicting one preferred embodiment of a system implementing the network media channel according to the present invention.

FIG. 1 depicts a diagram of one preferred embodiment of a system 100 implementing a network media channel. The system 100 comprises a first mobile device 102, a server 104, and a second mobile device 106 interconnected via a network 108, such as the Internet. The user interface of the present invention may be accessed via the first and second mobile devices 102 and 106, and/or the server 104. The first mobile device 102 may be used to access the user interface. One or more control keys such as 110, 112, 114, 116, 118, and 120 may utilize the user interface in order to create, modify, transmit, and receive media files and kernel (discussed below). A display 122 may be used to provide a visual representation of the media files according to the kernel.

The user interface is accessed via the first mobile device 102 to create one or more media files containing text, image, audio, video, or any combination thereof, and transmitting them to the network 108. The user interface also enables the user to further create a first kernel which is also transmitted to the network 108. The server 104 receives the media files and first kernel from the network 108 and stores them in a repository. The server 104 allows access to the repository according to the first kernel. The user interface may also be accessed via the second mobile device 106. The user of the second mobile device 106 may use the user interface to create a second kernel and transmit it to the network 108 and automatically receive one or more media files of one or more users according to the second kernel. Upon receiving the one ore more media files, the second mobile device 106 automatically displays the media files according to the second kernel. A notification of any update to the media files also may be received, either automatically or manually, by the second mobile device 106. It should be clear to a skilled artisan that the present invention is not limited to mobile devices and that various other devices, such as personal computers can be used to achieve the same task. It should also be clear to a skilled artisan that the first mobile device 102 and the second mobile device 106 are interchangeable and further that each of the devices 102 and 106 can be replaced by a corresponding first and second server.

The user interface, implemented on the system 100, enables subscribers such as the users of the first and second mobile devices 102 and 106 to exchange data, such as media files, according to an ad-hoc specification created by one or both subscribers. This ad-hoc specification, referred to as the kernel, may be a function of time, space, channel identity, mask, or any combination thereof.

A user of the first mobile device 102 may use the user interface to create and/or modify a media file which contains (1) text message, including hyperlinks, utilizing a keyboard of the mobile device 102, (2) image, which may be obtained using a camera onboard the first mobile device 102, (3) audio, which may be obtained using a microphone onboard the first mobile device 102, and (4) video, which may be obtained using a video recorder onboard the first mobile device 102. The user interface is used further to create and/or modify a first kernel, comprising one or more components (see the above identified co-pending non-provisional patent application), and to associate it with the media file. The media files are stored in one or more servers, such as the server 104, according to the first kernel and may be accessed by other subscribers.

A user of the second mobile device 106 may utilize the user interface to access the media files across the network. The user of the second mobile device 106 may use the user interface to create and/or modify a second kernel, comprising one or more components (see the above identified co-pending non-provisional patent application), for instance a username and a password. Upon transmission of the second kernel, the second mobile device 106 automatically receives one ore more media files according to the second kernel. The media files are automatically displayed on the display 122. For instance, the display 122 may show one or more images of other users and one or more media files associated with each of the images.

The system 100 depicted in FIG. 1 is a network environment and the user interface of the present invention facilitates an easy to use and non-technical method of information exchange across the network. In one embodiment, the user interface of the present invention may be implemented on the mobile device 102, which is equipped with appropriate hardware (not shown but known to skilled artisans) capable of utilizing a network media channel such as the one disclosed in the above identified co-pending non-provisional patent application. Among the hardware is a microprocessor having internal flash memory, internal clock which may be a crystal-type oscillator or other oscillator mechanism known to those practiced in the art, and a power supply which may be a discrete or integrated circuit configured to supply the microprocessor appropriate DC voltage. The microprocessor operates to control various functions of the mobile device 102 including control of peripheral units such as a camera, video recorder, voice recognition unit, GPS unit, text editor, and any other hardware that would be required to implement and utilize the user interface discussed herein. It is contemplated that the processor may be a combination of individual discrete or separate integrated circuits packaged in a single housing or it may be fabricated in a single integrated circuit.

The mobile device 102 is further equipped with a camera, including an image digitizer, capable of recording still images and a video recorder, including an image digitizer, capable of recording moving images. The still and moving images may be stored in the internal memory of the mobile device 102 via a control key, such as a push button key 110 and 112 of the mobile device 102. The mobile device 102 is further equipped with a system, such as a GPS system, capable of recording a GPS location of the mobile device 102, or any other means, such as triangulation, that allows the position of the mobile device to be determined. The GPS location may be stored using a control key, such as a push button key 114 of the mobile device 102. The mobile device 102 is further equipped with a text editor capable of recording text. A control keyboard, such as a keyboard 116 or a voice recognition unit, including a voice digitizer, capable of transcribing voice into text, is used to enter and store text in the mobile device 102. The mobile device 102 is further equipped with a voice recorder, including a voice digitizer, capable of recording voice. A control key, such as a push button key 118, activates a microphone to receive voice and the digitized voice data from the voice digitizer is stored in the mobile device 102. The mobile device 102 is further equipped with a timer unit capable of generating a point in time or a time period via a control key 120 of the mobile device 102. As such, the mobile device 102 is capable of creating one or more media files and kernel. The mobile device 102 is further equipped with a network interface (not shown but known to skilled artisans) that is capable of communicating with the server 104 via the network 108. The mobile device 102 may communicate with the server 104 by wired or wireless connection. The user interface of the present invention may be implemented to create, access, manipulate, and display media files and/or kernels, to make full use of the capabilities and functionalities of a network media channel.

The network 108, depicted in FIG. 1 provides the necessary connections between the mobile device 102, the server 104, and the mobile device 106. The network 108 can be a combination of wired and wireless networks including the Internet, LANs, WANs, MANs, GSM, PSCs, known to skilled artisans. According to one preferred embodiment, the network 108 comprises a presence-based network including presence-based network applications, known to skilled artisans, where end users of devices such as the mobile devices 102 and 106, and network elements such as the server 104, to know the status, availability, location, and type of device used by other end users.

Figure 2:
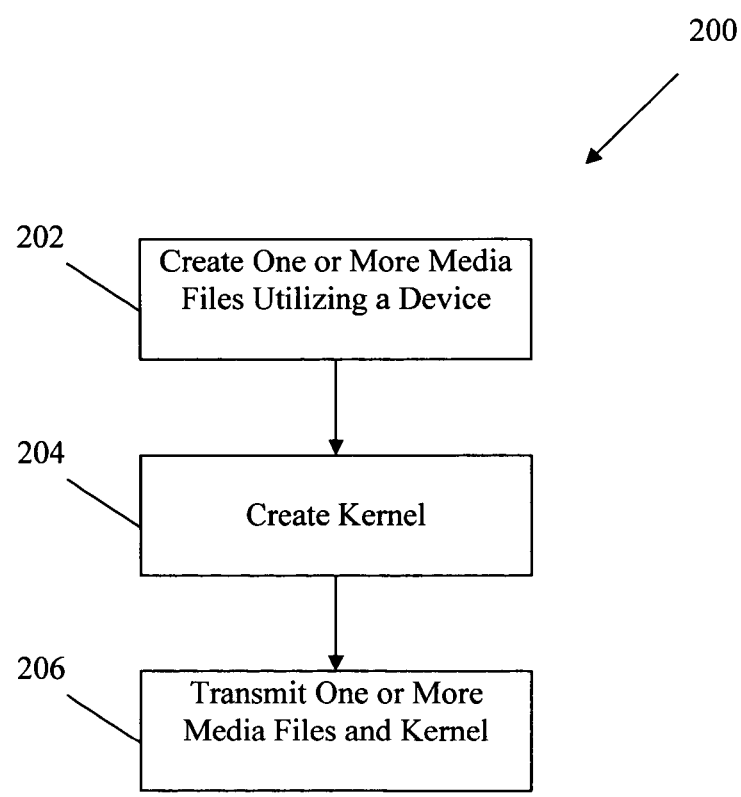
FIG. 2 shows a flow diagram of one preferred method of providing a user interface for a network media channel.

FIG. 2 shows a flow diagram 200 of one preferred method of utilizing a user interface for a network media channel. This method may be realized using the user interface implemented on the mobile device 102, the network 108, and the server 104, shown in FIG. 1. According to this method, the user interface is used to create one or more media file via the mobile device 102 at 202, to create a kernel at 204, and to transmit the media files and kernel to the network 108 at 206.

For instance, a user of the mobile device 102 may use the user interface of the present invention to create one or more media files by entering text, audio, and video, using the control keys 110 thru 120, as discussed above, and stores it in the internal memory of the processor of the mobile device 102. The user may also use the user interface to create a kernel which may contain a temporal component, a spatial component, a channel identity component, and a mask component, or any combination thereof. The user may further use the user interface to transmit the one or more media files and kernel to the server 104, where the server receives and stores the media files and kernel in a repository. The server 104 uses one or more application modules from an application suite residing in the server to organize the repository. According to one example of the present embodiment, the server 104 associates the one or more media files to the kernel.

In one instance, a transmitting subscriber using the mobile device 102 may utilize the user interface to create one or more media files, as described above, and a kernel containing:
 a. Temporal Component: (blank);
 b. Spatial Component: (blank);
 c. Channel Identity Component: (blank); and
 d. Mask Component: Person A, Person B, Person C.
The server 104 stores the media files and kernel in a repository and transmits a notice to the network. According to this example, the transmitting subscriber has utilized the user interface to store one or more media files in the server 104 and associated them with Persons A, B, and C.

Figure 3:
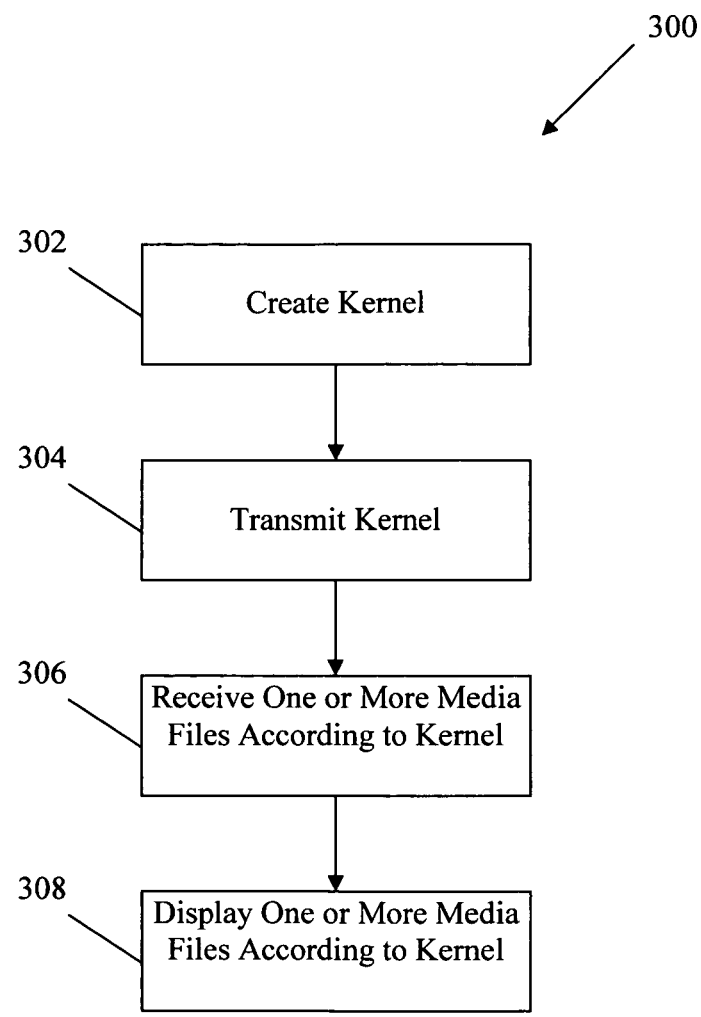
FIG. 3 shows a flow diagram of one preferred method of providing a user interface for a network media channel.

FIG. 3 shows a flow diagram 300 of one preferred method of utilizing a user interface for a network media channel. This method may be realized using the user interface implemented on the mobile device 106, the network 108, and the server 104, shown in FIG. 1. According to this method, the user interface is used to create a kernel via the mobile device 106 at 302, to transmit the kernel to the network 108 at 304, to receive one or more media files according to the kernel at 306, and displaying one or more media files according to the kernel.

For instance, a receiving subscriber who has a kernel loaded into his/her device comprising:
 a. Temporal Component: (blank);
 b. Spatial Component: (blank);
 c. Channel Identity Component: (blank); and
 d. Mask Component: Person A,
will be notified and able to receive the media files of the transmitting subscriber from the repository. Accordingly, the receiving subscriber may receive media files of one or more transmitting subscribers whose kernels contain Person A in the mask component. According to this example, the one or more transmitting subscribers may be thought of as an aggregate buddy list associated with Person A. The media files of the one or more transmitting subscribers are then displayed according to the receiving subscriber kernel as discussed below.

In another instance, a transmitting subscriber using the mobile device 102 may utilize the user interface to create one or more media files and kernel, as shown in FIG. 2, wherein the kernel contains:
 a. Temporal Component: the time period starting at 10:00 PM Dec. 2, 2005 and ending at 4:00 AM Dec. 3, 2005;
 b. Spatial Component: GPS coordinate of CBGB in NY;
 c. Channel Identity Component: LifeChannel; and
 d. Mask Component: Person A, Person B, Person C.
A receiving subscriber who has a kernel loaded into his/her device comprising:
 a. Temporal Component: any time between 10:00 PM Dec. 2, 2005 and 4:00 AM Dec. 3, 2005;
 b. Spatial Component: GPS coordinate of CBGB in NY;
 c. Channel Identity Component: LifeChannel; and
 d. Mask Component: Person A,
will be notified and able to receive the media files of the transmitting subscriber in accordance to the kernels created by said subscribers. The above examples illustrate that the user interface of the present invention may be utilized by one or more users to create media files and ad-hoc specifications for ad-hoc exchange of the media files.

Figure 4:
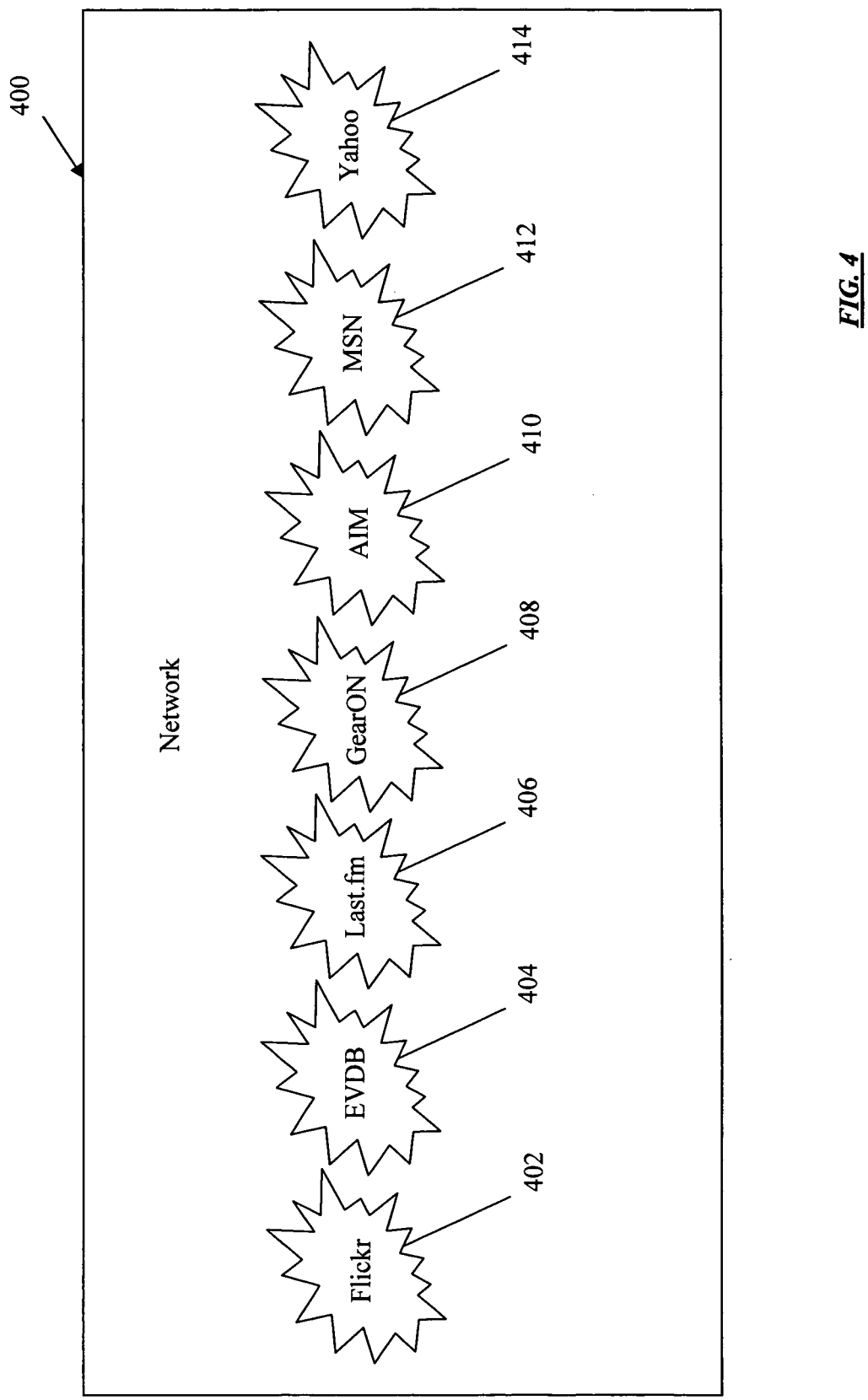
FIG. 4 shows a schematic diagram of a network comprising one or more networks where one or more media files may reside according to a preferred embodiment.

FIG. 4 shows a schematic diagram of a network 400 comprising one or more networks where one or more media files may reside. According to this preferred embodiment the network 400 comprises the network Flickr at 402, EVDB at 404, Last.fm at 406, GearON at 408, AIM at 410, MSN at 412, and Yahoo at 414. One or more servers across the network 400 contain one or more media files of one or more subscribers to be shared according to the methods described above.

For instance, a transmitting subscriber may use the user interface of the present invention to create one or more media files and kernel and to store them in the individual networks. For example, a user may associate his/her video files with the Flickr network 402 and music files with the Last.fm network 406, via a kernel. A receiving subscriber may use the user interface and receive the media files from the individual networks, Flickr at 402 and Last.fm at 406. For instance, the receiving subscriber may create and transmit a kernel containing his/her user ID and password, and receive one or more media files of one or more transmitting subscribers who have allowed access to their media files by the receiving subscriber.

A variation of the present method is when the network 400 comprises only one network, say GearON at 408. One or more transmitting subscribers may associate their media files with one or more of the channel identity components of a kernel associated with the media files. As described in the above identified co-pending non-provisional patent application, a kernel has a channel identity component that may be one of LifeChannel, MediaLife, NaviLife, and LocalLife. One or more transmitting subscribers may associate their personally created media files, say pictures obtained in a music concert, with the LifeChannel, and associate their music and video files with MediaLife. A receiving subscriber may use the user interface and receive the media files from one or more users that have associated their media files with the LifeChannel and MediaLife. Accordingly, the user interface of the present invention may be used to transmit and receive media files associated with individual networks or individual channel identities. The former embodiment eliminates the need for creating repositories (databases) in a network, while the latter embodiment eliminates the need to access multiple individual networks.

Figure 5:
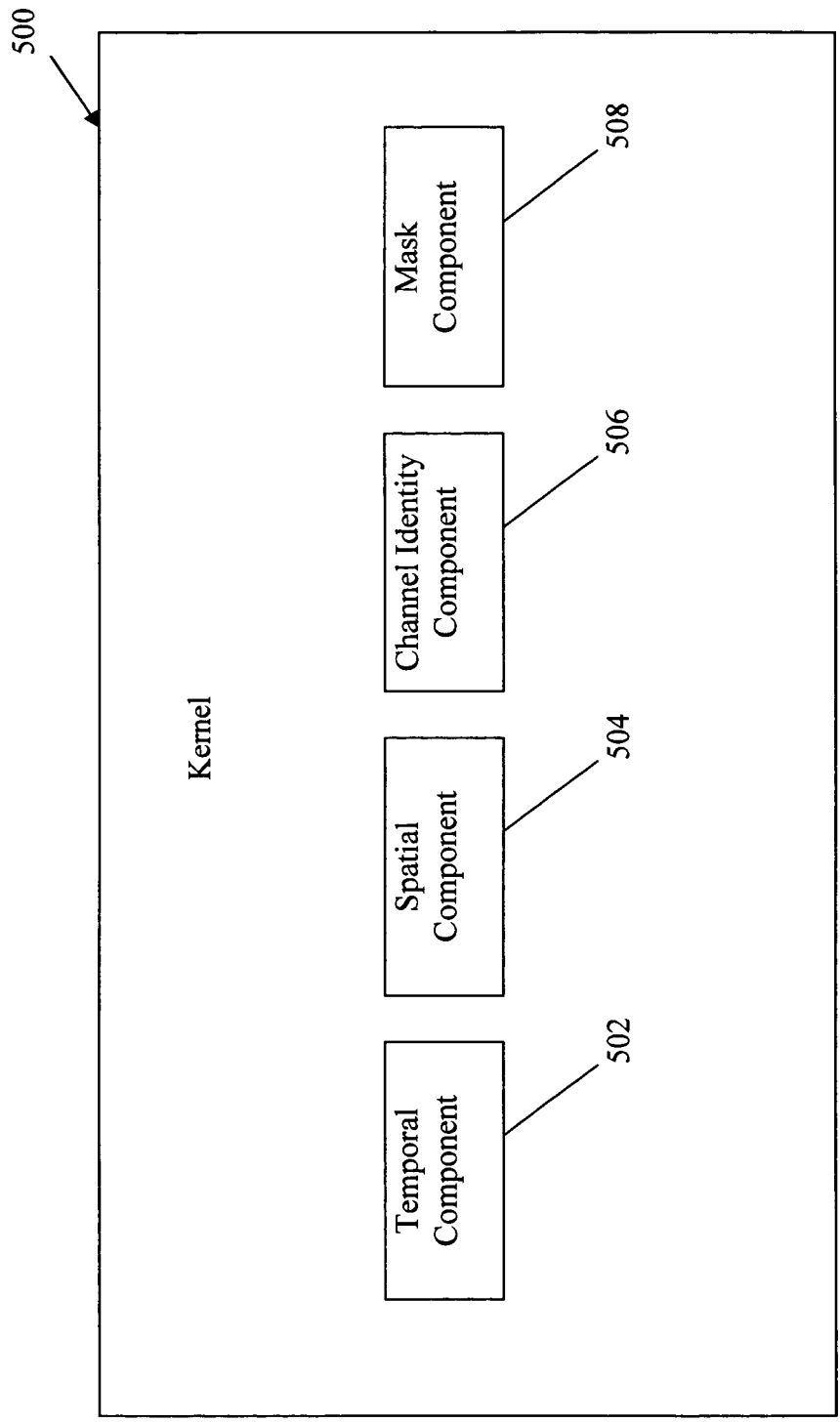
FIG. 5 shows a schematic diagram of a kernel according to a preferred embodiment.

FIG. 5 shows one preferred embodiment of a kernel 500 that may be constructed using the user interface of the present invention. According to this embodiment, the kernel 500 comprises one or more components, namely a temporal component 502, a spatial component 504, a channel identity component 506, and a mask component 508. As described in the above identified co-pending non-provisional patent application, each field of the kernel may comprise multiple entries for a particular media file.

A transmitting subscriber can create a kernel, such as the kernel 500, using the user interface via the control keys of a device, such as the mobile device 102, as discussed above. Similarly, a receiving subscriber can create a kernel using the user interface. As described in the above identified co-pending non-provisional patent application, the operation of the two kernels determines how the media files of the subscribers are shared. A transmitting subscriber's kernel determines the scope of access to his/her media files while a receiving subscriber's kernel determines the scope of reception of said media files, if any. In this manner, a transmitting subscriber controls the network's access to his/her media files and a receiving subscriber controls reception of media files available on the network.

Figure 6:
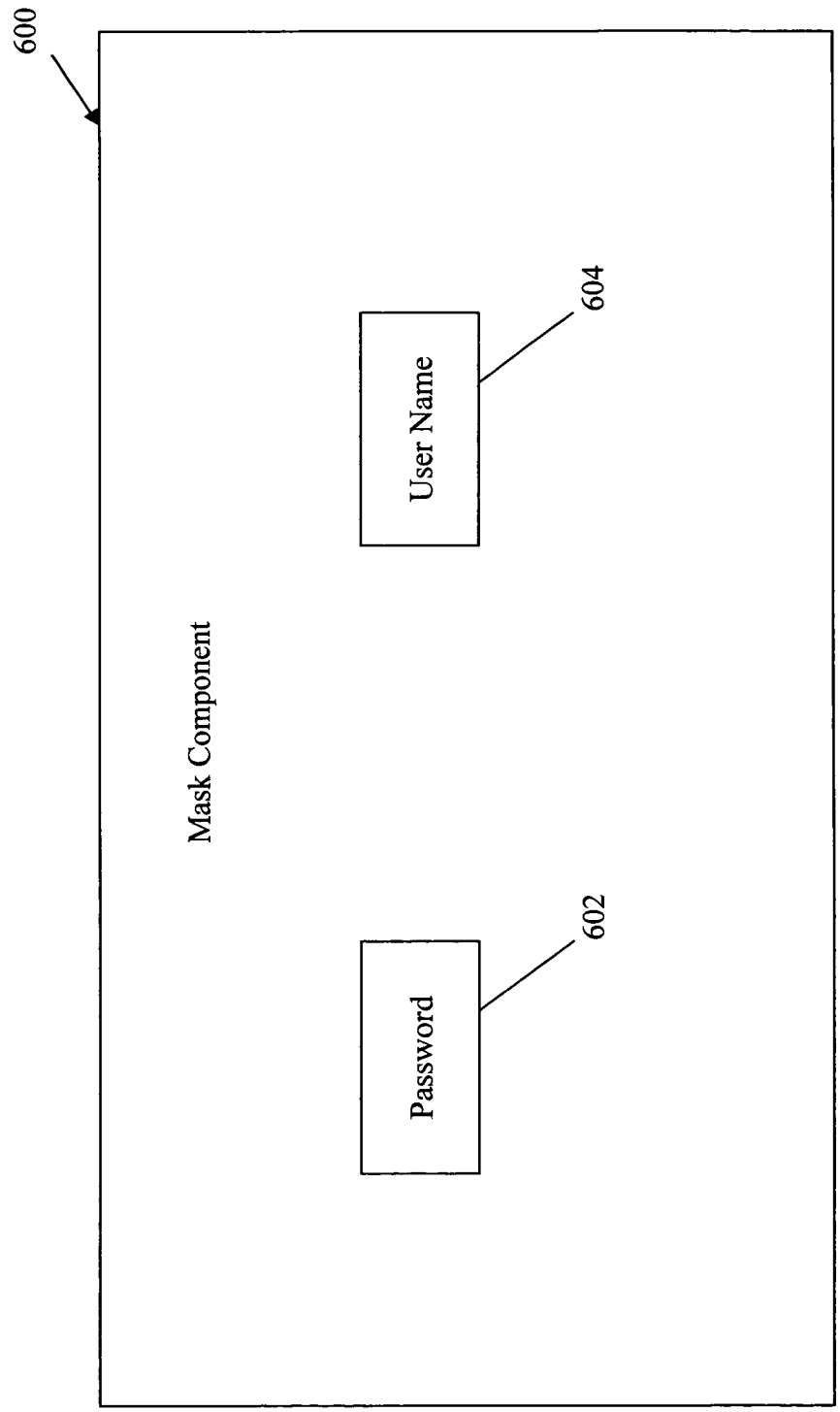
FIG. 6 shows a schematic diagram of a mask component of the kernel shown in FIG. 5 according to a preferred embodiment.

FIG. 6 shows one preferred embodiment of a mask component 600 of a kernel such as that shown in FIG. 5. According to this embodiment, the mask component 600 comprises a password 602 and user name 604. For instance, in connection with the above discussion utilizing several individual networks, the user name and password can be used to identify a receiving subscriber, whose password is used to verify access, and the user name is used to determine one or more transmitting subscribers, if any, whose media files have been associated with the receiving subscriber. The user interface of the present invention may be utilized to construct the other components of the kernel as shown in FIG. 5. For instance, the user interface can be used to input a temporal period, into the temporal component, a GPS location into the spatial component, a channel such as the LifeChannel, MediaLife, NaviLife, and LocalLife, or a network such as the Flickr, EVDB, Last.fm, GearON, AIM, MSN, and Yahoo, into the channel identity component of the kernel, using the control keys of the mobile device 102.

Figure 7:
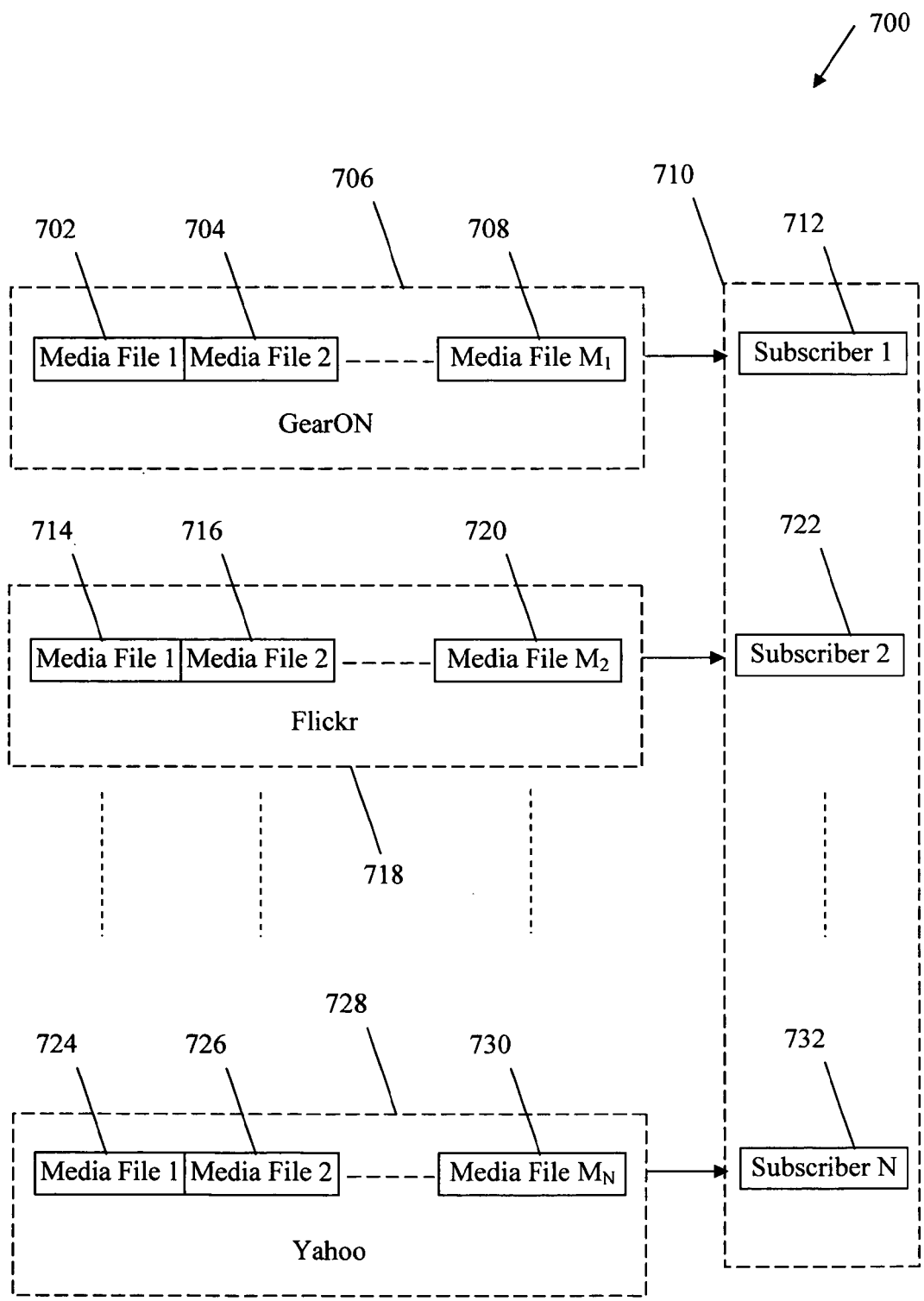
FIG. 7 shows a schematic diagram of receiving one or more media files according to a preferred embodiment.

FIG. 7 shows a schematic diagram 700 of one preferred embodiment of receiving one or more media files. As described above in relation to FIG. 4, one or more users may have one or more media files stored in different networks such as the Flickr, EVDB, Last.fm, GearON, AIM, MSN, and Yahoo. For instance, subscriber 1 at 712 may have media files 1 thru $M_1$ residing in the GearON network at 706, subscriber 2 at 722 may have media files 1 thru $M_2$ residing in the Flickr network at 718, and subscriber N at 732 may have media files 1 thru $M_N$ residing in the Yahoo network at 728.

A receiving subscriber may use the user interface to transmit a kernel comprising the elements as described above in connection with FIGS. 3, 5, and 6. As such, the kernel comprises a mask component that includes a username and a password. Upon transmitting the kernel, the receiving subscriber receives one or more media files from one or more individual networks such as the Flickr, EVDB, Last.fm, GearON, AIM, MSN, and Yahoo networks. This occurs upon the operation of the first and second kernels as described in the co-pending provisional and non-provisional applications.

An aggregate buddy list is thus created by the operation of the kernels. When a receiving subscriber transmits a kernel comprising his username and password, he/she receives media files of other subscribers that have associated their media files to the receiving subscriber via kernels. According to this embodiment, the aggregate buddy list is made up of a collection of subscribers who are associated with the aforementioned individual networks. Accordingly, the media files belonging to one or more subscribers do not have to reside in a single network.

Figure 8:
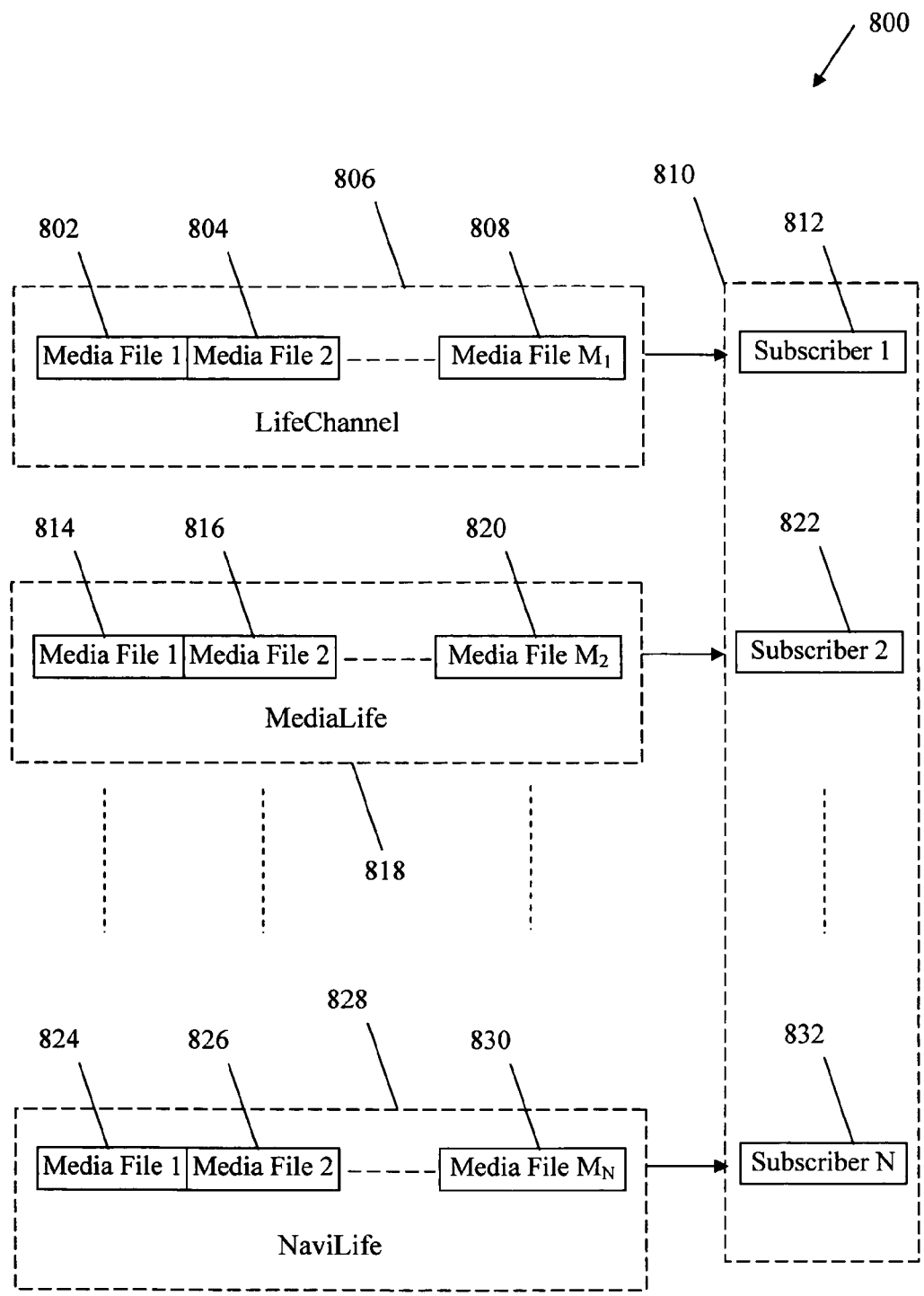
FIG. 8 shows a schematic diagram of receiving one or more media files according to a preferred embodiment.

FIG. 8 shows a schematic diagram 800 of one preferred embodiment of receiving one or more media files. As described above in relation to FIG. 4, one or more users may have one or more media files stored in a single network, such as GearON, wherein subscribers' media files reside in the single network but are categorized according to channel identity. For instance, subscriber 1 at 812 may have media files 1 thru $M_1$ categorized under LifeChannel at 806, subscriber 2 at 822 may have media files 1 thru $M_2$ categorized under MediaLife at 818, and subscriber N at 732 may have media files 1 thru $M_N$ categorized under NaviLife. This occurs upon the operation of the first and second kernels as described in the co-pending provisional and non-provisional applications.

The user interface may be used to create media files and associate them with one or more channel identities, such as the LifeChannel, MediaLife, NaviLife, and LocalLife, via appropriate kernels. LifeChannel is associated with capturing, editing, publishing, and browsing personal media. MediaLife is associated with entertainment media. NaviLife is associated with communicating and planning events. LocalLife is associated with publishing and browsing personal media and information in a location specific context.

LifeChannel may be associated with media files that represent daily stream of personal media content broadcast to a virtual channel. According to one embodiment, it may represent a collection of media files that has been created by subscribers as a function of time. It has much in common with bloging and mobloging in that users can capture their own media such as camera phone pictures, audio clips, etc. and publish them in a formatted media object that they can share with their communities and engage in dialog about.

MediaLife may be associated with media files that represent entertainment media, such as music, films, and games. According to one embodiment, a receiving subscriber may brows through one or more files belonging to one or more transmitting subscribers that have been associated with MediaLife so as to enable him/her to see what the transmitting subscribers are listening to, watching, reading, playing, or in general, the media files they are consuming.

NaviLife may be associated with media files that represent planning and scheduling. It facilitates browsing thru the media files of subscribers to see who is attending what event, and further to allow the subscribers to coordinate events among one another. According to one embodiment, a transmitting subscriber may associate his/her media files with NaviLife to promote events, by producing event flyers, photographing a particular event, and embedding the photographs in the even flyers.

LocalLife may be associated with media files that are location based. Subscribers may share media files according to specific locations or geographic borders. According to one embodiment, a receiving subscriber may receive one or more media files of one or more transmitting subscribers according to the things that are around him/her, such as when the transmitting subscriber is in a city searching for public events that are nearby.

Figure 9:
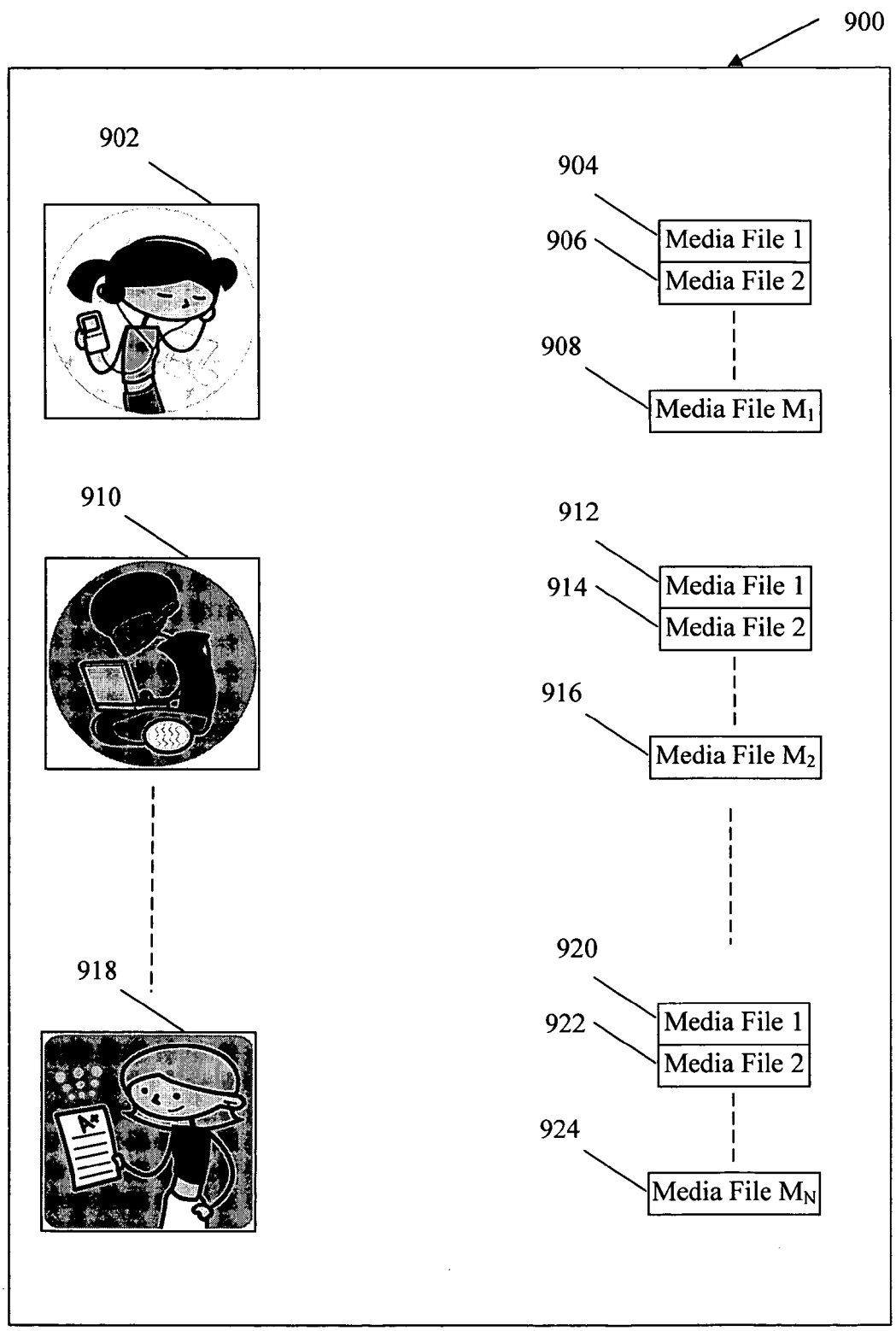
FIG. 9 shows a schematic diagram of displaying one or more media files according to a preferred embodiment.

FIG. 9 shows a schematic diagram 900 of one preferred embodiment of displaying one or more media files. Utilizing the user interface, a receiving subscriber transmits a kernel and receives one or more media files according to the kernel. For instance, a kernel that comprises a username and a password, as described above, may result in one or more media files of one or more transmitting subscribers. A display of a device, such as the display 122 of the mobile device 102 provides a visual representation of the one or more media files according to the kernel. An image of a transmitting subscriber 902 is associated with media files 1 thru $M_1$ 904 thru 908. Similarly, images of transmitting subscribers 910 thru 918 are each associated with media files 1 thru $M_2$ thru 1 thru $M_N$. This method of display provides an easy to use access to other subscribers' media files. Furthermore, the images of the transmitting subscribers provide a visual representation to a buddy list generated thru the operation of kernels as discussed above.

Figure 10:
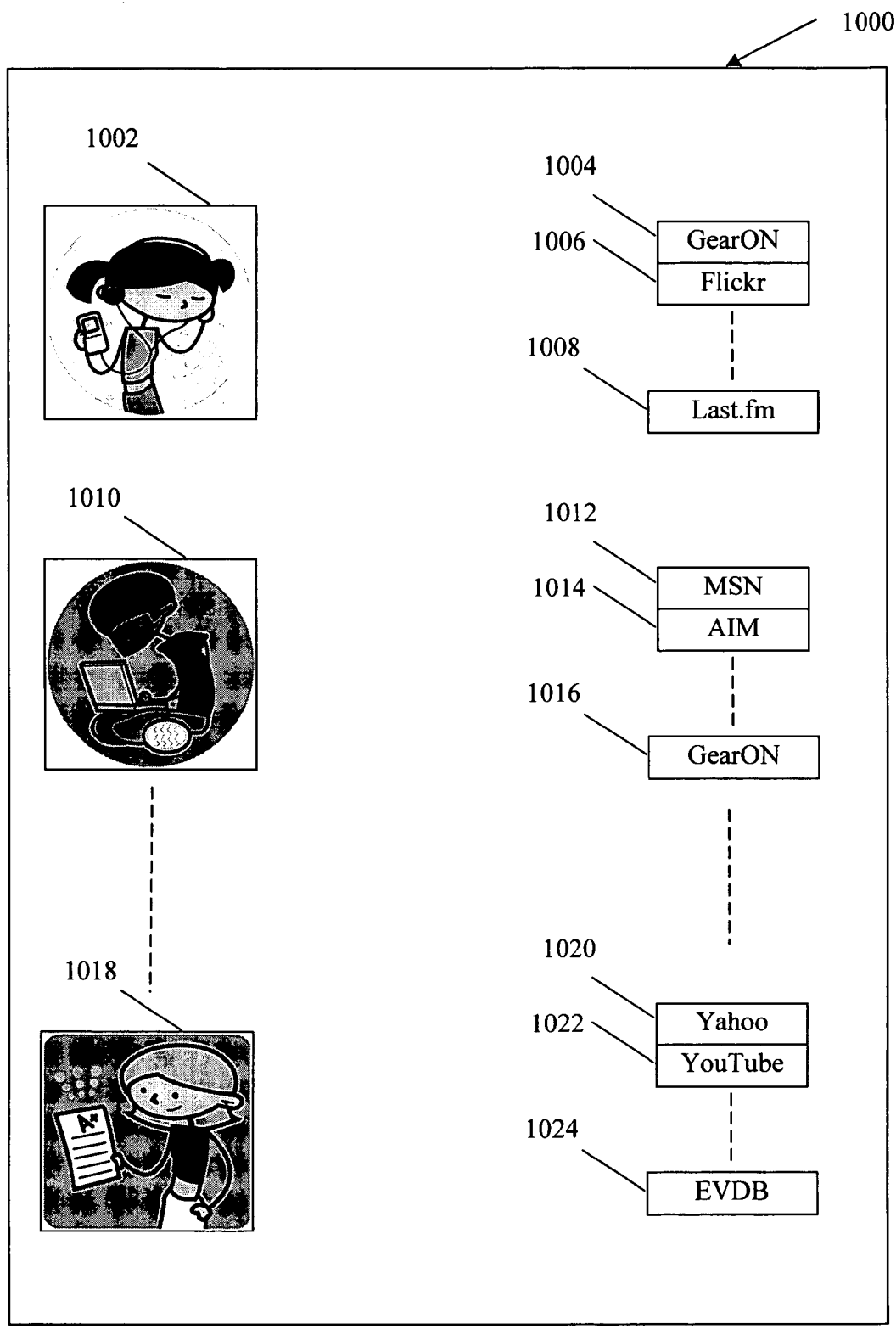
FIG. 10 shows a schematic diagram of displaying one or more media files according to a preferred embodiment.

FIG. 10 shows a schematic diagram 1000 of one preferred embodiment of displaying one or more media files. Similar to the operations discussed in relation to FIG. 9, a receiving subscriber may use the user interface to receive and display one or more media files according to the kernel that he/she creates and transmits. Following with the previous example, if the kernel comprises the receiving subscriber's user name and password, one variation of the above presentation is to display images of one or more transmitting subscribers, 1002 thru 1018, and associating the images to one or more URLs 1004 thru 1024, representing the networks where the media files reside. Such representation may provide a quicker more efficient way of representing the type of media files said transmitting subscribers hold.

Referring to FIG. 10, transmitting subscriber 1002 has media files that reside in networks GearON at 1004, Flickr at 1006, thru Last.fm at 1008. A receiving subscriber can quickly infer that the transmitting subscriber 1002 owns media files that are associated with the displayed networks, such as the GearON network being associated with media files categorized according to channel identities, the Flickr network 1006 being associated with video files, the Last.fm network 1008 being associated with music files, etc. The user interface may be used to further explore the media files further. According to one embodiment, the media files can be displayed by clicking (activating) on the URLs.

Figure 11:
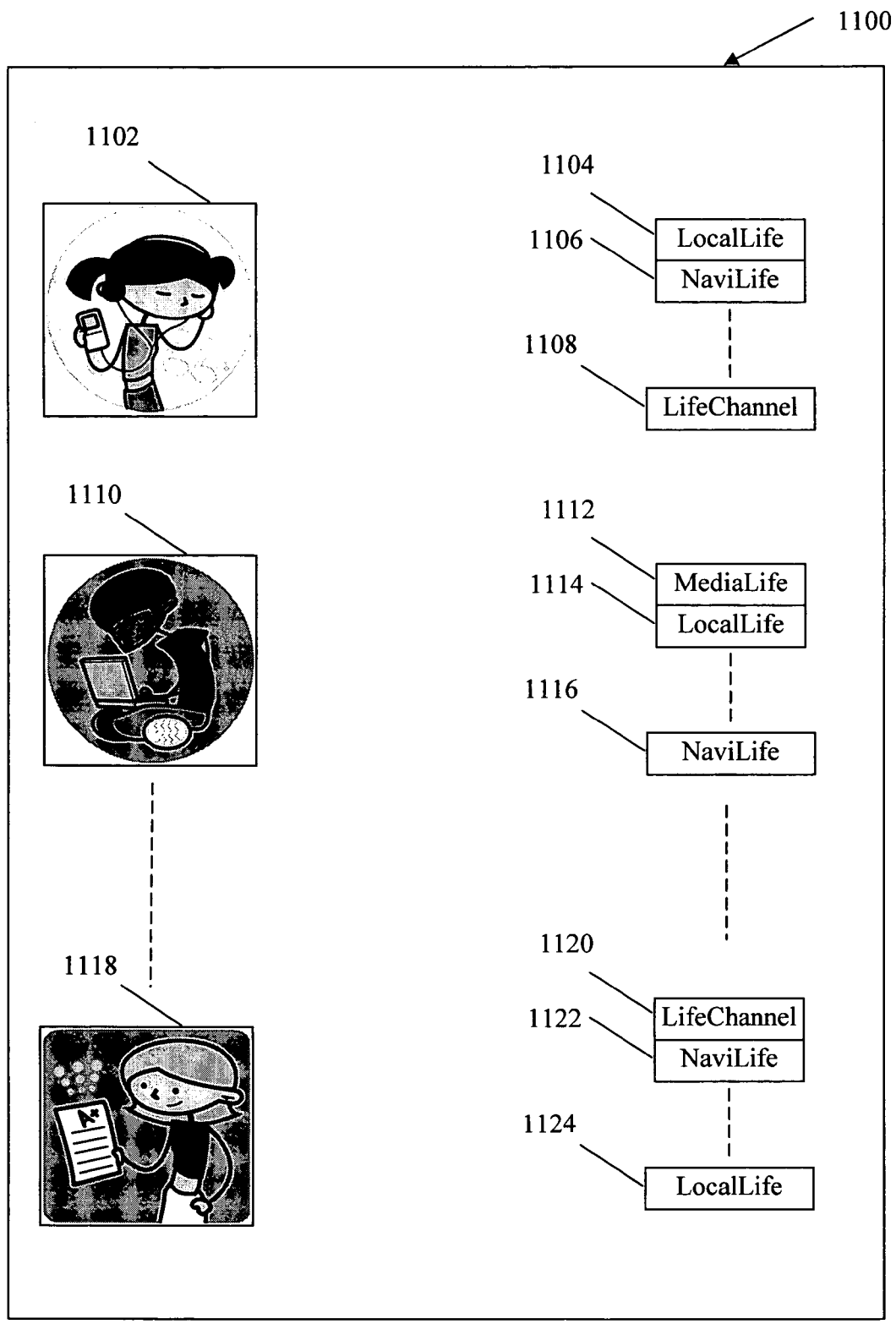
FIG. 11 shows a schematic diagram of displaying one or more media files according to a preferred embodiment.

FIG. 11 shows a schematic diagram 1100 of one preferred embodiment of displaying one or more media files. According to this embodiment, the images of transmitting subscribers 1102 thru 1118 have associated with them media files that are in turn associated with channel identities of a kernel component. For instance, a receiving subscriber may use the user interface to transmit a kernel comprising:

a. Temporal Component: (blank);
b. Spatial Component: (blank);
c. Channel Identity Component: LifeChannel, NaviLife, and LocalLife; and
d. Mask Component: Username, Password.

The transmitting subscriber 1102 thru 1118 have, thru appropriate kernels, allowed the receiving subscriber to have access to their media files that are associated with the LifeChannel, NaviLife, and LocalLife. Thus, the user interface will automatically display the image of a transmitting subscriber 1102 and his/her media files sorted according to LocalLife media files 1104, NaviLife media files 1106, thru LifeChannel media files 1108. The same kind of graphical representation will be utilized to show the images of other transmitting subscribers 1110 thru 1118 and their categorized media files 1112 thru 1124. The receiving subscriber may further navigate thru the media files as displayed by clicking on the channel identities, 1104 thru 1124, to see the media files.

For instance, clicking on the LifeChannel 1108 associated with a transmitting subscriber 1102 may display a series of images of a wedding that said subscriber has created and stored. Clicking on the NaviLife 1116 associated with the transmitting subscriber 1110 may display media files that pertain to an upcoming event such as a party that is to take place at a restaurant. Alternatively, clicking on the LocalLife 1124 associated with the subscriber 1118 may display media files that are location specific, such as video clips obtained from different location of a city.

The forgoing discloses a user interface for a network media channel that can be used to share media files among subscribers to the channel. The user interface makes it possible for users to create media files and kernels for ad-hoc sharing of their media files. The user interface can be used to transmit, receive, and display media files according to the kernels. All references and distinctions with respect to transmitting and receiving subscribers, made herein, are for clarification purposes only. It should be clear to a skilled artisan that a transmitting subscriber may, at another instance, be a receiving subscriber and vice versa.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A method for providing a user interface for a network media channel, the user interface being accessible via a device, said method comprising:
   creating one or more media files by a transmitting subscriber;
   creating a first kernel having a first mask component, wherein the mask component defining at least one receiving subscriber and a first scope of access to said one or more media files authorized to said at least one receiving subscriber, and said first kernel further integrates communication modalities used by said transmitting subscriber; and
   transmitting said one or more media files and said first kernel to a server, where said one or more media files are utilized according to said first kernel by said server;
   creating a second kernel having a second mask component by said at least one receiving subscriber, wherein the second mask component comprises a username and a password;
   transmitting the second kernel;
   receiving one or more media files according to the second kernel by said server; and
   displaying one or more images of one or more transmitting subscribers and wherein each image is associated with one or more URLs, wherein each URL is associated with one of the communication modalities used by said one or more transmitting subscribers.

2. The method of claim 1, wherein said one or more media files comprise at least one of a text component, an image component, an audio component, and a video component.

3. The method of claim 1, wherein said first kernel comprises at least one of a temporal component, a spatial component, and a channel identity component.

4. The method of claim 1, further comprising:
modifying at least one of the one or more media files and said first kernel; and
transmitting at least one of said modified one or more media files and said first kernel.

5. The method of claim 1, further comprising:
(a) receiving a notice indicative of an update.

6. The method of claim 1, further comprising:
modifying said at least one of the one or more media files and the second kernel; and
transmitting said at least one of said modified one or more media files and the second kernel.

7. The method of claim 1, further comprises receiving one or more media files as determined by the second mask component.

8. The method of claim 7, wherein the second mask component comprises an aggregate buddy list, said aggregated buddy list comprises a collection of one or more transmitting subscriber associated with one or more networks.

9. The method of claim 1, further comprises displaying one or more images of one or more transmitting subscribers and wherein each image is associated with one or more media files of said one or more transmitting subscribers.

10. The method of claim 1, further comprises displaying one or more images of one or more transmitting subscribers associated with a channel identity component of the second kernel.

11. The method of claim 10, further comprising displaying one or more media files associated with the channel identity component via clicking on the one or more images.

12. The method of claim 1, further comprising navigating through the displayed media files via clicking on said media files.

13. A computer program embodied on a non-transitory computer readable medium for providing a user interface for a network media channel, the user interface being accessible via a device, said computer program comprising:
a code segment that creates one or more media files by a transmitting subscriber;
a code segment that creates a kernel having a mask component defining at least one receiving subscriber and a first scope of access to said one or more media files authorized to said at least one receiving subscriber;
a code segment that transmits said one or more media files and said kernel;
a code segment that integrates at least one communication modalities used by said transmitting subscriber;
a code segment that creates a second kernel having a second mask component by said at least one receiving subscriber, wherein the second mask component comprises a username and a password;
a code segment that transmits the second kernel;
a code segment that receives one or more media files according to the second kernel by said server; and
a code segment that displays one or more images of one or more transmitting subscribers and wherein each image is associated with one or more URLs, wherein each URL is associated with one of the communication modalities used by said one or more transmitting subscribers.

14. The computer program of claim 13, further comprising:
a code segment that modifies at least one of the one or more media files and kernel; and
a code segment that transmits at least one of said modified one or more media files and kernel.

15. A computer program embodied on a non-transitory computer readable medium for providing a user interface for a network media channel, the user interface being accessible via a device, said computer program comprising:
a code segment that creates one or more media files by a transmitting subscriber;
a code segment that creates a first kernel, said first kernel comprising
(i) a channel identity component;
(ii) a mask component comprising defining at least one receiving subscriber and a first scope of access to said one or more media files authorized to said at least one receiving subscriber; and
(iii) at least one of a temporal component and a spatial component;
a code segment that transmits said one or more media files and said first kernel; and
a code segment that integrates at least one communication modalities used by said transmitting subscriber;
a code segment that creates a second kernel having a second mask component by said at least one receiving subscriber, wherein the second mask component comprises a username and a password;
a code segment that transmits the second kernel;
a code segment that receives one or more media files according to the second kernel by said server; and
a code segment that displays one or more images of one or more transmitting subscribers and wherein each image is associated with one or more URLs, wherein each URL is associated with one of the communication modalities used by said one or more transmitting subscribers.

16. The computer program of claim 15, further comprising:
a code segment that receives a notice indicative of an update.

17. The computer program of claim 15, further comprising:
a code segment that modifies at least one of the one or more media files and second kernel; and
a code segment that transmits at least one of said modified one or more media files and second kernel.

18. The computer program of claim 15, further comprising:
a code segment that creates a second kernel, said second kernel comprising
(i) a channel identity component;
(ii) a mask component comprising a username and a password; and
(iii) at least one of a temporal component and a spatial component; and
a code segment that receives one or more media files according to the second kernel; and
a code segment that displays the one or more media files according to the second kernel.

19. A computer system configured to execute a computer program to provide a user interface for a network media channel, the user interface being accessible via a device, said system comprising:
logic that creates one or more media files by a transmitting subscriber;
logic that creates a first kernel having a first mask component, wherein the mask component defining at least one receiving subscriber and a first scope of access to said one or more media files authorized to said at least one receiving subscriber, and said first kernel further integrates at least one communication modalities used by said transmitting subscriber; and logic that said one or more media files and said first kernel to a server, where said one or more media files are utilized according to said first kernel by said server;

logic that creates a second kernel having a second mask component by said at least one receiving subscriber, wherein the second mask component comprises a username and a password;

logic that transmits the second kernel;

logic that receives one or more media files according to the second kernel by said server; and logic that displays one or more images of one or more transmitting subscribers and wherein each image is associated with one or more URLs, wherein each URL is associated with one of the communication modalities used by said one or more transmitting subscribers.

20. The system of claim 19, further comprising:

logic that modifies at least one of the one or more media files and said first kernel; and logic that transmits at least one of said modified one or more media files and said first kernel.

21. The system of claim 19, further comprising: logic that receives a notice indicative of an update.

22. The system of claim 19, further comprising:

logic that modifies at least one of the one or more media files and said second kernel; and logic that transmits at least one of said modified one or more media files and said second kernel.

* * * * *